Jan. 30, 1962 TEIJI YAMURA 3,018,948

APPARATUS FOR PRODUCING PUNCHED TAPE FOR TELEPRINTER FOR TRANSMISSION OF CHARACTERS OF CHINESE ALPHABET

Filed Jan. 16, 1961 3 Sheets-Sheet 1

INVENTOR.
TEIJI YAMURA
BY Wenderoth, Lind & Ponack
ATTORNEYS

Jan. 30, 1962 TEIJI YAMURA 3,018,948

APPARATUS FOR PRODUCING PUNCHED TAPE FOR TELEPRINTER FOR TRANSMISSION OF CHARACTERS OF CHINESE ALPHABET

Filed Jan. 16, 1961 3 Sheets-Sheet 2

INVENTOR.
TEIJI YAMURA

BY Wenderoth, Lind & Ponack
ATTORNEYS

Jan. 30, 1962 TEIJI YAMURA 3,018,948

APPARATUS FOR PRODUCING PUNCHED TAPE FOR TELEPRINTER FOR TRANSMISSION OF CHARACTERS OF CHINESE ALPHABET

Filed Jan. 16, 1961 3 Sheets-Sheet 3

INVENTOR.
TEIJI YAMURA
BY Wenderoth, Lind & Ponack
ATTORNEYS

United States Patent Office 3,018,948
Patented Jan. 30, 1962

3,018,948

APPARATUS FOR PRODUCING PUNCHED TAPE FOR TELEPRINTER FOR TRANSMISSION OF CHARACTERS OF CHINESE ALPHABET

Teiji Yamura, 23 Jonai Hanamaki-shi, Hanamaki-shi, Japan

Filed Jan 16, 1961, Ser. No. 82,922
3 Claims. (Cl. 234—123)

The present invention relates to a keyboard type apparatus for producing a punched tape for use in a teleprinter transmitting device, and which is capable of encoding on the punched tape the characters of the Chinese alphabet.

As is known, in order to adequately reproduce the Chinese language on a typewriter or like device, it is necessary to select and reproduce some two thousand six hundred characters. It will be obvious that to have a separate key for each of these characters would require a keyboard which would be completely unwieldy and practically impossible to operate with any degree of rapidity.

It is an object of the present invention to provide an apparatus for producing a punched tape for a teleprinter transmitting apparatus for transmitting the characters of the Chinese alphabet, which has a relatively simple keyboard, yet which can produce a coded representation for over two thousand six hundred different characters.

Other and further objects of the present invention will become apparent from the following specification and claims, taken together with the accompanying drawings, in which:

Figure 1:
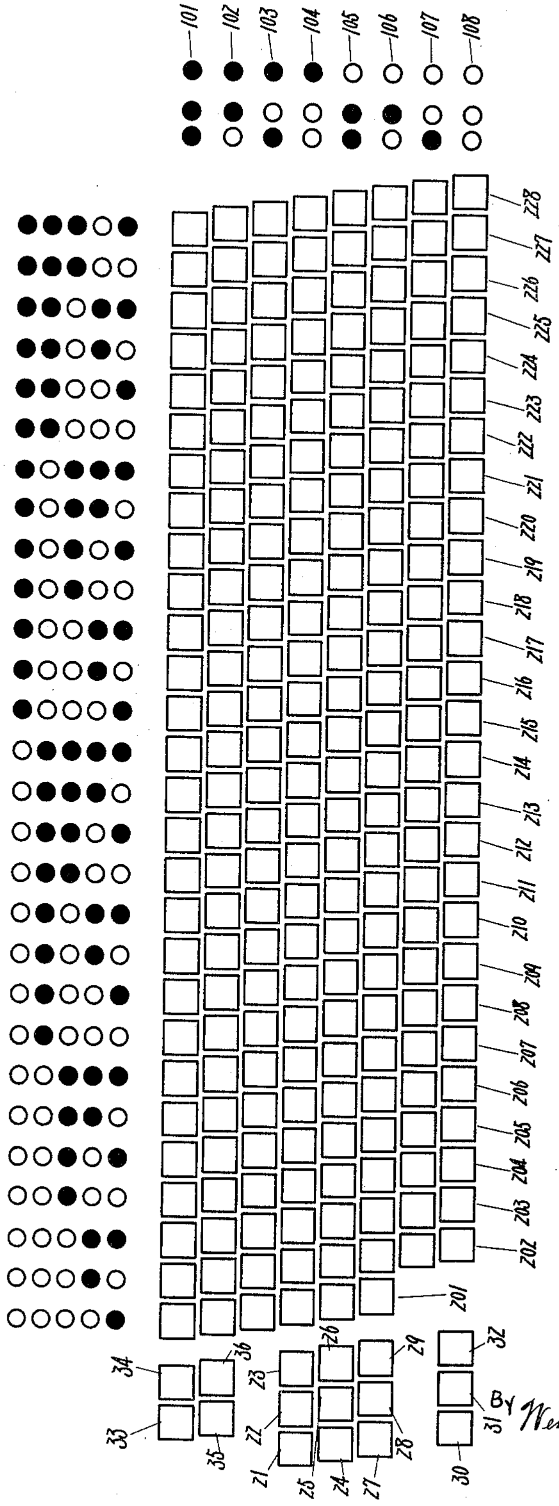
FIG. 1 is a representation of the keyboard of the apparatus according to the present invention together with a representation of the patterns of punched out holes produced by each of the keys in the columns and rows.

As seen in FIG. 1, the keyboard consists basically of eight rows 101–108 of keys arranged in twenty-eight columns 201–228, the two end columns having only six keys therein. Above each column is a representation of the column indicating punches which are produced when any key in the column in question is depressed, and at the right hand end of each row is a representation of the row indicating punches which are produced when any key in the row in question is depressed. (Dark spaces represent holes, and circles represent unpunched hole positions.) Thus, when any key in any column or row is depressed, a group of punches is produced which is the sum of the column indicating punches and the row indicating punches, so that each key is identified by a unique set of punches. With eight rows of twenty six keys each plus two columns of six keys each, there can therefore be produced two hundred and twenty unique punch patterns.

Figure 2:
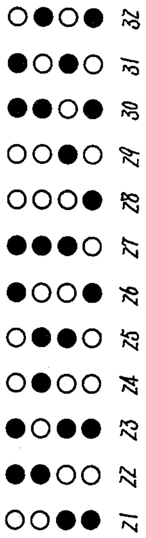
FIG. 2 is a representation of the patterns of punched out holes produced by a series of division keys shown at the lower left of the keyboard of FIG. 1.

The Chinese characters to be represented are arbitrarily divided up into twelve divisions of approximately two hundred and twenty characters each, nine divisions being the most commonly used characters, and three being those used less often. There are then provided twelve division keys 21–32, each of which produces a punch pattern different from the punch patterns for the row and column indicating punches, which division indicating punch patterns are shown in FIG. 2. Thus by depressing one of the division keys, an operator may select one of twelve divisions, and by pressing one of the keys in the rows and columns, an operator may select one of the two hundred and twenty characters within a division.

It is therefore possible to punch a pattern which will represent any one of two hundred and twenty characters in any one of twelve divisions, or any one of two thousand six hundred and forty characters. This is ample for use with the Chinese alphabet.

Figure 6:
FIG. 6 is a representation of the top of one of the keys in the rows and columns of keys of FIG. 1.

Because the characters in the divisions represented by keys 30–32 are used so seldom, it has been found convenient to show on each key in the columns and rows of keys none of the twelve characters which that key can be caused to punch out on the tape. The manner in which the top of the key has these characters shown on it is seen in FIG. 6. Other arrangements are of course possible, and it would be easy to place all twelve of the characters which can be obtained with each key on the top of the key. However, this would make the representations quite small, or it would be necessary to enlarge the key itself.

Moreover, it is also possible to have different numbers of rows and columns, and less or more keys in each column, and less or more division keys, as long as the total number of individual punched patterns which can be produced is sufficient to provide a separate pattern for each character to be represented. The arrangement shown is believed to be efficient from the standpoint of operation by an operator, since one hand can control the division keys while the other hand can roam the remainder of the keyboard.

Figure 3:
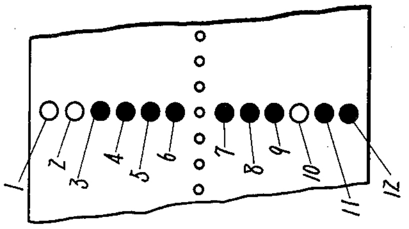
FIG. 3 is a representation of a portion of a tape punched to represent a character produced by pressing one of the keys in the rows and columns of keys of the keyboard and one of the division keys.

It will be appreciated that the total number of hole positions in the pattern which will identify any given character in the system as described above is twelve, five positions being used for identifying the column and three the row of the key in the columns and rows of keys, and four for identifying the division. One way of arranging a pattern of hole positions on the punched tape is shown in FIG. 3, in which the pattern is a vertical line of positions. In the pattern shown, hole positions 1, 2, 3 and 4 are for identifying the division key, hole positions 7–11 are for identifying the column of the key from the rows and columns of keys, and the punch positions 5, 6 and 12 are for identifying the row of the key from the rows and columns of keys. The pattern shown is produced by the key in column 228 and row 101, and by division key 21.

Figure 4:
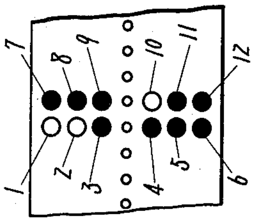
FIG. 4 is a representation of a tape showing a slightly different way of arranging the pattern of punched out holes for the character shown in FIG. 3.

In order to accommodate the punch patterns produced according to the present invention on standard tape having a width sufficient to accommodate six hole positions, it is necessary to place the twelve hole positions in a plurality of side by side columns, each of which has a fraction of the total number of hole positions which is the reciprocal of a whole number, here 2. Thus there are 2 columns of positions each, as shown in FIG. 4. The twelve positions represent the hole positions for identifying the various keys in the same sequence as in the hole pattern shown in FIG. 3.

Figure 5:
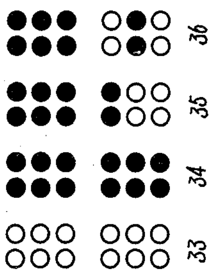
FIG. 5 is a representation of the pattern of punched out holes produced by a series of operating keys shown at the upper left of the keyboard of FIG. 1.

It is of course necessary to have keys which place on the tape punched hole patterns which will cause the sending of signals for the performance of these operations. Operating keys 33–36 are provided in the upper left hand corner of the keyboard of FIG. 1 which produce hole patterns on the tape for various operations. The pattern of the punched out holes produced by these keys is shown in FIG. 5. Key 33 produces a pattern for a space, key 34 a pattern for a delete sign, key 35 produces a pattern for causing a carriage return, and key 36 is a link transition key. The patterns are seen to be in the double column form shown in FIG. 5.

Figure 7:
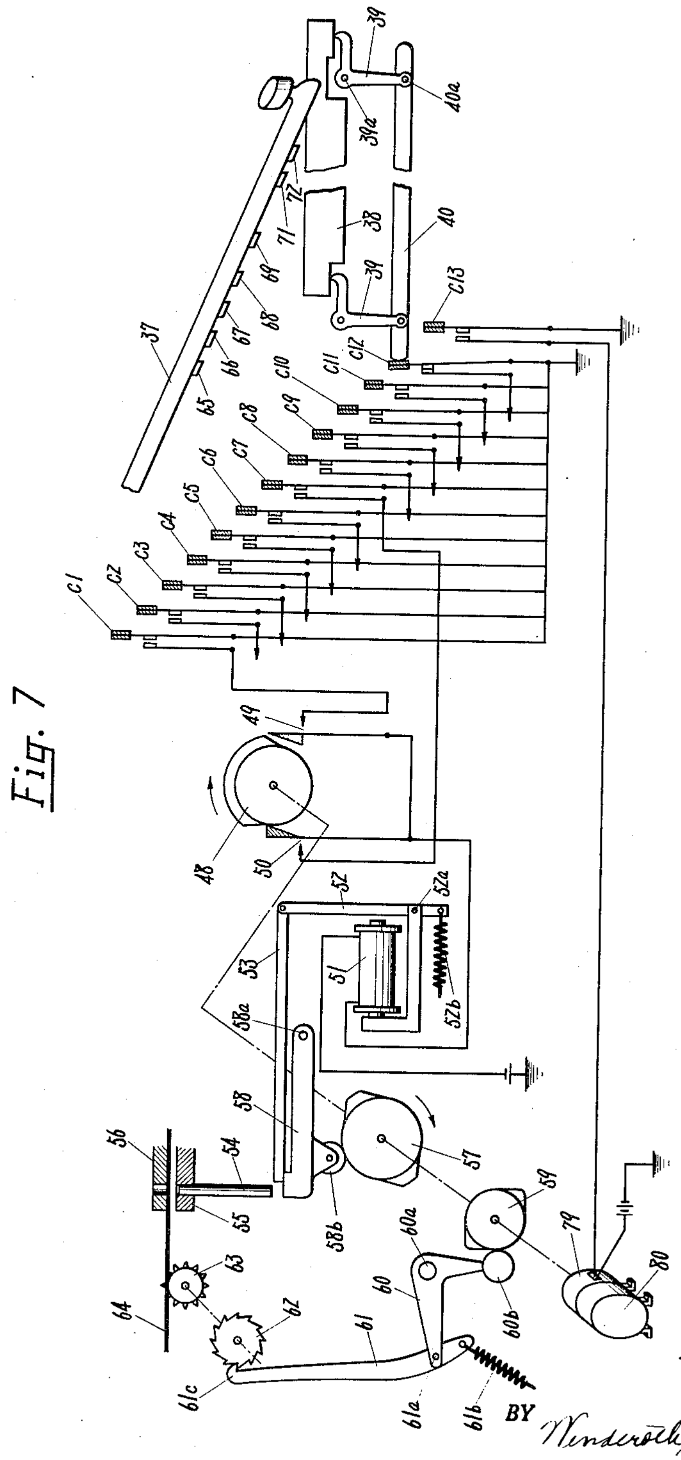
FIG. 7 is a schematic representation of the apparatus for punching the tape.

The actual apparatus which punches the holes in the tape is schematically illustrated in FIG. 7. Beneath the portion of the keyboard having the columns and rows of keys are positioned a series of eight parallel selector bars 38, one for each of the positions of the holes in the tape which identifies one of the keys on this portion of the keyboard. A key bar 37 is provided for each key, the key being mounted on the free end of the bar and the bar being movable substantially vertically up and down over the selector bars 38. Since it is desired to push only certain of the selector bars 38 down, according to the pattern of holes which will represent the key in question, there are provided on the bottom of the key bar 37 a series of protrusions. The bar in question is for the key in row 101 and column 228, so that protrusions here are shown as 65–72 corresponding to positions 5–9 and 11 and 12 at which holes are to be made as shown on the tapes of FIGS. 3 and 4. It is of course possible to provide notches in the selector bars 38 beneath the key bars 37 in the bars 37 in the bars which are not to be depressed when the key bar in question is to be depressed.

A similar set of four selector bars (not shown) is provided beneath similar key bars (not shown) for the division keys 21–32, and the operating keys 33–36 and these keys therefore will act on the same selector bars or a similar system of selector bars, and corresponding protrusions or notches are provided in the respective bars to produce the pattern of holes for positions 1–4 of FIGS. 3 and 4, or the pattern of holes as seen in FIG. 5.

A pair of crank arms 39 are pivoted at 39*a* beneath the ends of each selector bar 38, and the selector bars 38 bear against the free ends of one of the arms of each crank arm 39 to rotate it around pivot 39*a* when the selector bar 38 is depressed. Pivoted at 40*a* to the free ends of the other arms of each crank arm is a contact bar 40 which is caused to move laterally when the crank arms 39 are rotated. The selector bars 38, crank arms 39 and contact bars 40 together constitute selector bar means for closing contacts.

Adjacent the ends of each of the contact bars 40 is a contact which is closed when the contact bar is moved laterally. There are twelve of these contacts, C1–C12, contacts C1–C4 corresponding to the four contact bars moved by the selector bars beneath the keys 21–32, and contact C5–C12 corresponding to the eight contact bars moved by the selector bars beneath the keys in the columns and rows of keys. An additional contact C13 is provided for a purpose described hereinafter. When the key bar 37 shown in the figure is depressed, therefore, selector bars 38 which are depressed by the protrusions 65–72 will move corresponding contact bars to close contacts C5–C9 and C11 and C12. Similarly, when, for example, division key 21 is depressed, the proper selector bars and contact bars will be moved to close contacts C3 and C4.

One side of each of the contacts C1–C12 is connected to ground, while the other side of each of contacts C1–C6 is connected to one of a series of six first punch column contacts 49 (only one of which is shown) on one side of a contact closing cam 48, and the other side of each of contacts C7–C12 is connected to one of a series of second punch column contacts 50 (only one of which is shown) which are on the opposite side of the contact closing cam 48. Each of the punch column contacts 49 and 50 is normally open, but is closed when the closing cam 48 contacts them. The closing cam 48 has a cam profile such that during substantially all of a fraction of the rotation of the cam 48, which fraction is the reciprocal of a whole number, here 2, the first punch column contacts 49 are closed, while during substantially all of the remaining part of the rotation the second punch column contacts 50 are closed. These contacts and the contacts C1–C12 together constitute contact means actuated by the selector bar means.

The other side of each punch column contact 49 and 50 is connected to a common punch selector solenoid 51, which in turn is connected to ground through a source of power. Since there are six punch column contacts on each side of the closing cam 48, there are six common solenoids, only one being shown, however. Each solenoid acts on an armature 52 which is pivoted at one end at 52*a* and has pivoted to the other end thereof a selector finger 53 which extends at substantially right angles to the armature 52. Movement of the armature 52 toward and away from the solenoid 51 moves the selector finger back and forth in the direction of its length.

Beneath the free end of each selector finger 53 is a punch actuating lever 58 which is pivoted to the frame of the apparatus at 58*a*, and has on one side of the free end thereof a roller 58*b* which rolls on a punch cam 57. As indicated by the broken line, the punch cams are on the same shaft as the contact closing cam 48 and rotate at the same speed as the contact closing cam. The profile of each punch cam is such that the punch actuating lever 58 is raised a whole number of times, here twice, during each revolution, the times being the same as the times during which one or the other set of punch column contacts 49 or 50 are closed by the contact closing cam 48.

Positioned above the free end of each of the punch actuating levers 58 is a punch 54 which slides in the spaced parts 55 and 56 of a punch guide, the punch moving in aligned holes in the punch guide parts. A tape 64 is passed between the parts 55 and 56 so that it is punched when the punches are moved by the actuating levers 58. The solenoids, selector fingers, punch actuating levers and cams, together with the punches and guides therefore constitute punch means actuated by being energized through the contact means.

Indexing means is also provided for moving the type 64. Mounted on the same shaft with the punch cams 57 and the contact closing cam 48 is an indexing cam 59, the cam profile of which causes it to move roller 60*b*, with which it is in contact, a whole number of times, here 2, during each revolution of the shaft. However, the cam profile of the indexing cam 59 is offset from the profile of the punch cam so that the indexing cam 59 actuates the roller 60*b* between the actions of the cam profile of the punch cam 57 on the roller 53*b*. Roller 60*b* is on one end of an indexing crank arm 60 which is pivoted to the frame of the apparatus at 60*a*. The other end of the indexing crank arm 60 has pivoted thereto at 61*a* a ratchet arm 61. One end of ratchet arm 61 is spring loaded by means of spring 61*b*, while the other end has a hook 61*c* thereon. A ratchet wheel 62 is provided with which the hook 61*c* on the ratchet arm 61 cooperates. A cog wheel 63 is connected to the ratchet wheel 62 for rotation therewith, preferably by mounting the two wheels on the same shaft. The cog wheel 63 engages the tape 64 for indexing it periodically.

The shaft on which the cams 48, 57 and 59 are mounted is driven by a magnetic clutch 79, which in turn is driven by an electric motor 80. The magnetic clutch 79 is energized by means of a contact C13 which is closed whenever any key is depressed, the contact C13 being in a circuit through the magnetic clutch 79 and a source of power.

In operation, when one of the keys in the rows and columns of keys and one of the division keys 21–32 is depressed, selector bars 38 and contact bars 40 for the respective keys close the appropriate contacts C1–C12 as well as contact C13. In the example given in connection with FIG. 4, the contacts C5–C9, C11 and C12, as well as contacts C3 and C4 will be closed. This in turn will energize the corresponding punch column contacts 49 and 50. Since the contact C13 is also closed, the magnetic clutch 79 connects the shaft on which the cams 48, 57 and 59 are mounted to the motor 80, and the shaft and the cams are rotated. Starting from the position shown in FIG. 7, the contact closing cam 48 will first close the contacts 49, and thereby energize the solenoids 51 which are in the circuits corresponding to the contacts C1–C6 which are closed. In the case in question, the solenoids 51 in the circuits corresponding to the contacts C3–C6 are energized. The corresponding armatures 52 are thereby drawn against the solenoids 51, moving the selector fingers 53 to the left in the figure, so that the ends thereof are inserted between the ends of the punch actuating levers 58 and the punches 54.

At this point the profile on the punch cam 57 has moved so that the punch actuating lever is raised, and those punch actuating bars 58 on which the selector fingers have moved between the end thereof and the punch will lift the corresponding punches 54 and punch holes in the tape 64. In the case of those punch actuating bars 58 on which the selector fingers 53 have not moved because the corresponding solenoids 51 have not been energized, the punch actuating levers 58 will be lifted, but the ends thereof will not contact the punches 54, and no holes will be punched. In the example being discussed, holes will be punched in the 3–6 positions, as indicated by the dark spots in FIG. 4. No holes will be punched in the 1 and 2 positions.

The profile of the punch cam 57 then permits the punch actuating levers 58 to drop allowing the punches 54 to return to their normal position, and then the contact closing cam 48 moves to the position in which the first punch closing contacts 49 and allowed to open. The solenoids 51 are thereupon deenergized, and the springs 52*b* return the corresponding armatures 52 to the initial position ready for further movement in response to reenergization of the solenoids 51.

In the meanwhile, indexing cam 59, due to its offset from punch cam 58, has contacted roller 60*b* and moved indexing crank arm 60 to move the ratchet arm 61. This in turn indexes the ratchet wheel 62 and the cog wheel 63 to move the tape 64, thereby presenting an unpunched portion of the tape between the spaced parts 55, 56 of the punch guide.

At this point the contact closing cam 48 has moved so as to close the second punch closing contacts 50, thereby energizing the solenoids 51 which correspond to the circuits in which the contacts C7–C12 are closed. In the example in question the solenoids corresponding to the contacts C7–C9, and C11 and C12 will be energized. Again the corresponding selector fingers 53 are moved and a second series of holes are punched in appropriate positions in the tape 64 in the same manner as the first series of holes was punched. Thereafter, the indexing cam 59 again operates the ratchet mechanism to index the tape 64.

The similar system of selector bars and contact bars for the operating keys 33–36 will close the appropriate contacts C1–C12 to produce the punch patterns shown in FIG. 5.

It is thought that the invention and its advantages will be understood from the foregoing description and it is apparent that various changes may be made in the form, construction and arrangement of the parts without departing from the spirit and scope of the invention or sacrificing its material advantages, the for hereinbefore described and illustrated in the drawings being merely a preferred embodiment thereof.

What is claimed is:

1. In an apparatus for punching a pattern of holes in a tape for use in a teleprinter transmitter, the combination of a keyboard having a first plurality of keys in rows with the keys in the rows arranged in columns, said keyboard having a second plurality of keys, means for punching a tape having a plurality of punches for punching a first plurality of holes in the tape to indicate a row of said first plurality of keys, for punching a second plurality of holes in said tape to indicate a column of said first plurality of keys, and for punching a third plurality of holes for indicating a key of said second plurality of keys, the number of said punches being a fraction of the number of holes in said first, second and third pluralities of holes, said fraction being a reciprocal of a whole number, means actuated by a key in said first plurality of keys and the simultaneous action of a key in said second plurality of keys for actuating said plurality of punches a number of times equal to the said whole number, and indexing means actuated by said keys simultaneously with said means for punching said tape for indexing said tape a number of times equal to the said whole number at times between the action of said means for punching said tape.

2. The combination as claimed in claim 1 in which said whole number is two, said punching means actuating said punches twice and said indexing means indexing said tape twice, once between actuation of said punching means and once after the second actuation of said punching means.

3. The combination as claimed in claim 2 in which there are twenty-six columns of eight keys each, and two columns of six keys each in said first plurality of keys, and there are twelve keys in the second plurality of keys, and the number of punches is six, each key in said first plurality of keys being identified by a series of punched holes up to eight in number and each key in said second plurality of keys being identified by a series of punched holes up to four in number, and said punching means comprising a plurality of selector bar means moved by the action of said keys, a plurality of contacts, the individual contacts of which are closed by said selector bar means depending on the keys of said pluralities which are actuated, a first plurality of six punch column contacts to which a portion of said contacts is connected, a second plurality of six punch column contacts to which the remainder of said contacts is connected, a solenoid operated punch selector means for each punch connected to the corresponding punch column contacts in both pluralities of punch column contacts, and contact closing cams and punch cams rotating in synchronism and respectively closing said punch column contacts and actuating said punches, said contact closing cams and punch cams having cam profiles for first closing said punch column contacts in said first plurality of punch column contacts while said punch cams actuate said punches, and then closing said punch column contacts in said second plurality of punch column contacts while said punch cams again actuate said punches, and said indexing means comprising a cam rotating in synchronism with said contact closing cams and said punch cams and actuating said indexing means between the actions of said contact closing cams and said punch cams.

References Cited in the file of this patent

UNITED STATES PATENTS 2,945,538 Little et al. ______________ July 19, 1960